United States Patent Office 2,986,204
Patented May 30, 1961

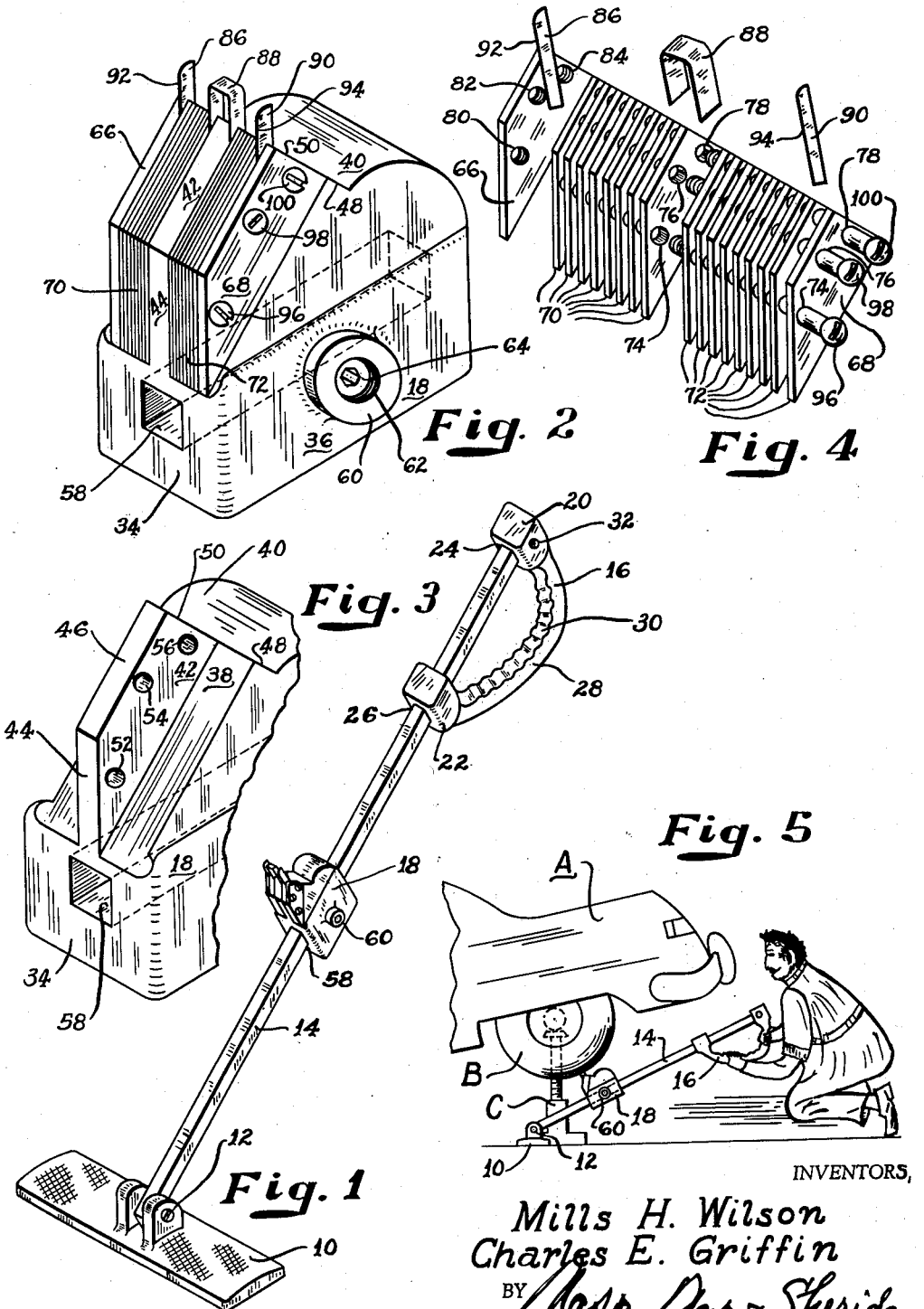

2,986,204

LEVER OPERATED TIRE SLITTING TOOL WITH BLADE HOLDER HAVING BLADE ADJUSTMENT MEANS

Mills H. Wilson and Charles E. Griffin, Winston-Salem, N.C., assignors to Progress Groovers, Inc., Durham, N.C., a corporation of North Carolina Filed Nov. 2, 1953, Ser. No. 389,765

1 Claim. (Cl. 157—13)

This invention relates to a tool for cutting one or more grooves in a vehicle tire, the tread portion of which have been worn down during the use of the tire, and is an improvement of the construction disclosed in our application Serial No. 364,998, filed June 30, 1953.

One of the objects of the invention is to provide an improved holding mechanism for rigidly supporting the cutting or grooving means in cutting position.

Another object is to provide an improved knife carrying block.

A further object is to provide means on the block for rigidly holding in proper spaced relationship, a plurality of cutters or knives.

An additional object is the provision of a rugged tire grooving tool that consists of a minimum of parts, the blade supporting means of which may be quickly assembled and disassembled for cutting grooves in tires of different sizes.

Yet another object is the provision of means for mounting a plurality of cutters in the adjustable supporting block of the tool.

Another object is to provide an improved adjustable handle in a tool of this type.

Other objects will be disclosed hereinafter throughout the specification.

In the drawings:

Figure 1 is a perspective view of the re-grooving tool;

Figure 2 is a perspective enlarged view of the block and the cutters and spacing shims thereon;

Figure 3 is a view similar to Figure 2 with the cutters and shims removed therefrom;

Figure 4 is an exploded perspective view of the cutters, shims and the mounting means therefor; and Figure 5 is a perspective view showing the tool in position for cutting or re-grooving a tire.

Referring to the drawings, A indicates the rear end of a vehicle and B one of the tires thereof. Although the vehicle shown is a passenger car, trucks, buses, agricultural implement and other types of vehicle tires may be as readily re-grooved by the re-grooving tool of this invention. During use of the tire re-grooving tool, the tire is raised by means of a lifting device, such as the jack C shown in Figure 5. This tire grooving tool is particularly adapted for grooving the wheels of a vehicle, particularly wheels which may be driven by the engine of the vehicle.

As shown in Figure 1 of the drawings, the tire grooving tool is provided with a base 10 having a pivot 12 pivotally supporting a standard 14. The cross section of this standard may be multi-sided as shown, or of any convenient shape which will prevent the rotation of the handle 16, and the block 18. Both the handle and block are slidably supported on the standard 14, and are adjustably held in any desired position on the standard by means hereinafter described.

Referring to handle 16, this handle is provided with a plurality of heads 20 and 22 that are provided with apertures 24 and 26 respectively, whereby the handle may be slid along standard 14. The handle also includes a curved portion 28, which latter has an inner handhold comprising an undulated portion 30. Handle 20 may be held in adjusted position on the standard by screw 32 that extends through head 20 as far as aperture 24, so as to engage the standard when tightened by a suitable tool.

The invention is particularly concerned with the construction of the block, cutters and means for retaining the same at the proper cutting angle. A block 18 is provided with a straight face 34, side faces 36, and an inclined face 38. This latter face extends from face 34 to the curved top portion 40. Extending medially along said face is a fixed fin or plate 42. This fin has a forward face 44 lying in the same plane as face 34, and an inclined face 46 which is parallel or substantially so, with inclined face 38. A block is provided for the rearwardly inclined face 48 which connects face 38 with curved top portion 40, and the fin has a rear face 50 that preferably lies in the same plane with face 48. The fin or plate 42 has a plurality of transverse spaced apertures 52, 54 and 56 of smooth bore, as shown in Figure 3.

In order to permit sliding movement of block 18 to permit adjustment of the same, the block is provided with a transverse passageway 58. Extending outwardly from the side face 36 is a boss 60 having a screw threaded aperture 62 that extends as far as the passageway 58. This aperture receives screw 64, the inner end of which (not shown) may be tightened against standard 14 to retain the standard in any adjusted position.

As shown in Figure 2, the means for supporting the cutting knives consists of plate 42. Additionally, as shown in Figures 2 and 4, end plates 66 and 68 are provided, and interposed between these end plates and central plate 42 are a plurality of sets of shims 70 and 72.

The sets of shims, as well as plates 68, are provided with apertures of smooth bore as indicated at 74, 76 and 78; while end plate 66 is also provided with apertures 80, 82 and 84 that have internal screw threads.

These parts, together with plate 46, are for the purpose of retaining in rigid position, a plurality of cutters or grooving knives 86, 88 and 90. Preferably, cutters 86 and 90 are of knife-like shape, and each is provided with a cutting edge 92 and 94. Central cutter 88 is of a U-shape, and the legs of this cutter preferably straddle fixed fin 42 and lie against the outside faces thereof as shown in Figure 2. Plate 46, therefore, preferably is of a width that is equal to the distance between the legs of the cutter 88.

The cutters, end plates and shims are rigidly secured in position by means of the screws 96, 98 and 100. These latter have smooth cylindrical shank portions as shown in Figure 4, and ends which are screw threaded so that they may threadedly engage threaded apertures 80, 82 and 84 of plate 66.

It will be understood that the apertures of plate 42 and those of the end plates 66 and 68, and of the groups of shims 70 and 72 are all spaced from each other in such manner that each of the screws will extend through corresponding apertures in these members. And the spacing of the two upper apertures in each of these members, such as shown in Figure 4, is such that the shank of the blade of each cutter 86, 88 and 90 is of a width equal to the distance between said upper pair of apertures.

Tightening of the screws 96, 98 and 100, after the parts have been assembled as shown in Figure 2, will cause plate 66 and shims 70 to be drawn to the right, and plate 68 and shim 72 to be drawn to the left toward fixed center plate 46. This will rigidly clamp the knives in a fixed proper cutting position for grooving a tire.

In operation, one wheel B, such as one of the wheels on the rear axle, is elevated by means of the jack C, with the opposite wheel (not shown) of the rear axle in engagement with the pavement. The car engine is started and the single rear wheel is caused to be rotated at a low rate of speed by means of the car clutch mechanism, or other drive means for coupling the engine to the rear wheel.

Assuming that the cutting means has been previously firmly anchored in cutting position, the tool is moved to the position, such as that shown in Figure 5. As the wheel B is slowly rotated, the cutting means is brought into contact with the worn tread of the tire, and one or more grooves are cut in the tire, depending upon the number of cutters that are used. Following this operation, an adjustment of the cutting means may be made so that the cutters forming said cutting means will be differently located on the block so as to cut in the next operation, grooves either between first grooves that have been cut, or to cut a groove outside of the previously cut groove or grooves.

The invention may be embodied in other specific forms without departing from the essential characteristics thereof. Hence, the present embodiment is to be considered in all respects merely as being illustrative and not as being restrictive, the scope of the invention being indicated by the appended claim rather than by the foregoing description, and all modifications and variations as fall within the meaning, purview and range of equivalency of the appended claim are therefore intended to be embraced therein.

Having thus described the invention, what is desired to be claimed and secured by Letters Patent of the United States is:

A tire grooving tool for grooving a tire while mounted on a car wheel with the wheel jacked up comprising a support, said support having a flat ground-engaging surface, an elongated standard, means pivotally mounting said standard to said support, a cutter block, said cutter block having a channel therein, said channel adapted to receive said standard, means for securing said block in a locked position at any point along said standard, cutting means having cutting edges having at least some of said edges in the plane of said standard and removably and adjustably mounted on said block, whereby the reactive force of the cutting operation is parallel to the longitudinal axis of the standard, means on said standard and the channel of said block preventing relative rotation of said block on said standard, and handle means secured adjacent the opposite end of said standard from said support, said channel having a first opening and a second opening, said block having an inclined face whose lower end lies adjacent said first opening and whose upper end is comparatively remotely located with relation to said second opening, said inclined face lying directly above said channel when said block is mounted on said standard and in place on said standard, a plurality of shims, and means clampingly engaging said shims on said inclined face and for holding said cutting means to said shims.

References Cited in the file of this patent

UNITED STATES PATENTS

| | | |
|---|---|---|
| 280,667 | P'poole et al. | July 3, 1883 |
| 584,133 | McIntire | June 8, 1897 |
| 798,325 | Daddysman | Aug. 29, 1905 |
| 1,299,688 | De Long | Apr. 8, 1919 |
| 1,522,628 | Holt | Jan. 13, 1925 |
| 1,537,376 | Prosser | May 12, 1925 |
| 1,653,104 | Kimmerling | Dec. 20, 1927 |
| 1,668,214 | Liebau | May 1, 1928 |
| 1,723,221 | Vandervoort et al. | Aug. 6, 1929 |
| 1,939,833 | Schwartz et al. | Dec. 19, 1933 |
| 1,975,930 | Errig | Oct. 9, 1934 |
| 2,000,300 | Scruby | May 7, 1935 |
| 2,105,316 | Fleming | Jan. 11, 1938 |
| 2,186,429 | Reinwald | Jan. 9, 1940 |
| 2,350,375 | Stephens | June 6, 1944 |
| 2,366,685 | Chambers | Jan. 2, 1945 |
| 2,437,296 | Forsberg | Mar. 9, 1948 |
| 2,606,612 | Dinnan | Aug. 12, 1952 |
| 2,618,056 | Van Alstine | Nov. 18, 1952 |
| 2,638,984 | Errig | May 19, 1953 |

FOREIGN PATENTS

| | | |
|---|---|---|
| 525,655 | France | June 14, 1921 |
| 403,717 | Great Britain | Dec. 29, 1933 |